Jan. 18, 1966

E. U. COHLER 3,229,927

CONTROL SYSTEMS

Filed Dec. 5, 1962

4 Sheets-Sheet 1

INVENTOR.
EDMUND U. COHLER
BY [signature]
ATTORNEY

Jan. 18, 1966 | E. U. COHLER | 3,229,927

CONTROL SYSTEMS

Filed Dec. 5, 1962 | 4 Sheets-Sheet 2

INVENTOR.
EDMUND U. COHLER

BY Fd Sullivan

ATTORNEY

Jan. 18, 1966 E. U. COHLER 3,229,927

CONTROL SYSTEMS

Filed Dec. 5, 1962 4 Sheets-Sheet 3

INVENTOR.
EDMUND U. COHLER

BY F. I. Sullivan

ATTORNEY

INVENTOR.
EDMUND U. COHLER
BY
ATTORNEY

United States Patent Office 3,229,927

Patented Jan. 18, 1966

3,229,927

CONTROL SYSTEMS

Edmund U. Cohler, Brookline, Mass., assignor to Sylvania Electric Products Inc., a corporation of Delaware Filed Dec. 5, 1962, Ser. No. 242,535
13 Claims. (Cl. 242—55.12)

This invention is concerned with control systems and particularly with the control of servo-mechanisms or other devices for compensating the driving speed of reels in, for example, magnetic tape transport equipments.

Present tape transporting mechanisms feature the following basic components: a pair of storage reels, a pair of tape drive capstans, a tape brake, a pair of vacuum wells, and a read-write head. One storage reel is arranged for feeding tape and the other for collecting it after the read or write operation, which is performed by the head actuated by appropriate electronics. Since the reels for storing the tape are of a relatively high mass, inertia problems are encountered when it is desired to start or stop their operation. Consequently, vacuum wells are usually provided to store the tape before it has passed from the feeding reel to the first capstan, and after it has passed the second capstan en route to the take-up reel. These vacuum wells hold a predetermined length of tape, so that the effect of a fast start or stop is buffered by the take-up of slack tape in the vacuum wells, thus avoiding the effect of the inertia of the reels.

Thus, tape is transported past the read-write head at a rate dependent upon the speed of rotation of the driving capstans and the effectiveness of their frictional engagement with the tape, and the speed of the reels must be constantly adjusted to maintain the buffer loops at a proper level in their respective take-up wells. This is accomplished by adjusting the angular velocity of the reels by means of compensating signal networks, which affect the motor control voltage in accordance with signals both from the present motor voltage, which is a good measure of motor speed, and the position of the tape in the buffer wells for which compensation is being made.

Some present sensing systems for determining the position of the tape in the buffer wells utilize a thin physical slit along the length of a vacuum pressurized tape well. The pressure at any point along the slit depends upon the tape position and is sensed by a pressure transducer. These systems are rather expensive and involve operational difficulties such as drift and slow response. Another technique uses one or more photocells, a light source, and a shaped mask, and inside the tape well. The light reaching the cell through the mask, and therefore the cell output, is a function of the position of the tape within the well. With this method, however, the signal output depends on the characteristics of the photocell in combination with the characteristics of the light source, both of which are subject to change with time and environmental conditions. Also, since the output signal from a photocell is rather low, this type of system requires high gain amplifiers and its input sensitivity is extremely critical.

The sensitivity of both these prior art techniques is also affected by the fact that the iron oxide dust abraded from the magnetic surface of the tape clogs vacuum ports and switches and clouds the surfaces of photocells and light sources to further affect their sensitivity. The result is that high speed magnetic tape transports of the type used with electronic computer systems require very deep buffer wells to compensate for lack of adequate control for their reel servo system. As a consequence, a separate bulky cabinet with vertical wells to accommodate each of its tape units is a characteristic feature of every computer installation. More compact installations with several tape units accommodated in a single cabinet by inserting magazine loaded tapes into receptacles serviced by short horizontal buffer wells would be possible if a more accurately responsive and reliable control for the reel servos of tape transport systems were available.

Accordingly, a primary object of the present invention is to provide an improved electronic control system. Another is to provide improvements in web transporting techniques and equipments.

A more specific object is to provide an improved means for compensating tape reel speed with respect to changes of tape length in the buffer wells of such equipments, and still further objects are to provide an improved means for sensing the length of tape in a buffer well, and to make short horizontal buffer wells practical.

These and other objects of the invention are accomplished in one illustrative embodiment which may be illustrated as featuring a series of photoconductors along the length of a magnetic tape buffer vacuum well with corresponding light sources, the communication between these sources and photoconductors being interruptable by movement of the tape loop along the length of the buffer well. The photoconductors are each connected across a separate resistor and all of the sensing resistors are connected to a common current summing resistor. Thus, as the tape moves up and down in the well, it turns photocells off and on thereby switching resistors in and out of the circuit to control the current through the summing resistor and, consequently, the speed of the reel servos.

The structure and operation of this sensing device and its associated electronics as well as other features, embodiments and modifications of the invention will be apparent from the following description and reference to the accompanying drawings, wherein.

Figure 1:
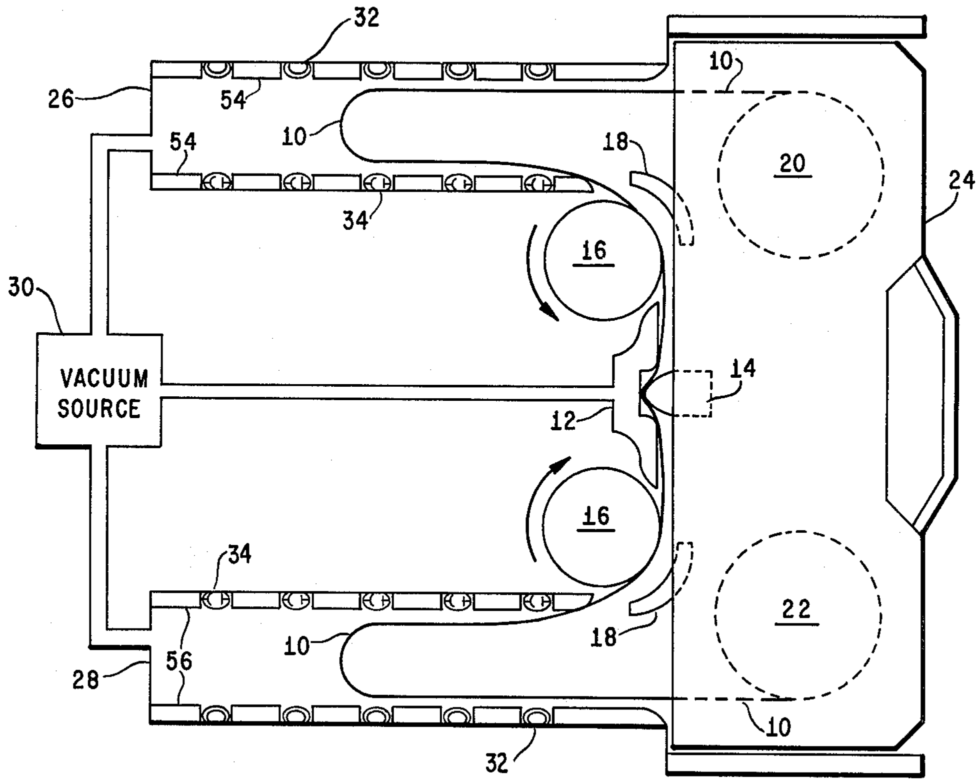
FIG. 1 is a diagrammatic representation of one embodiment of the invention as it may be employed to sense the position of tape in the buffer wells of a magnetic tape transport apparatus.
Figure 2:
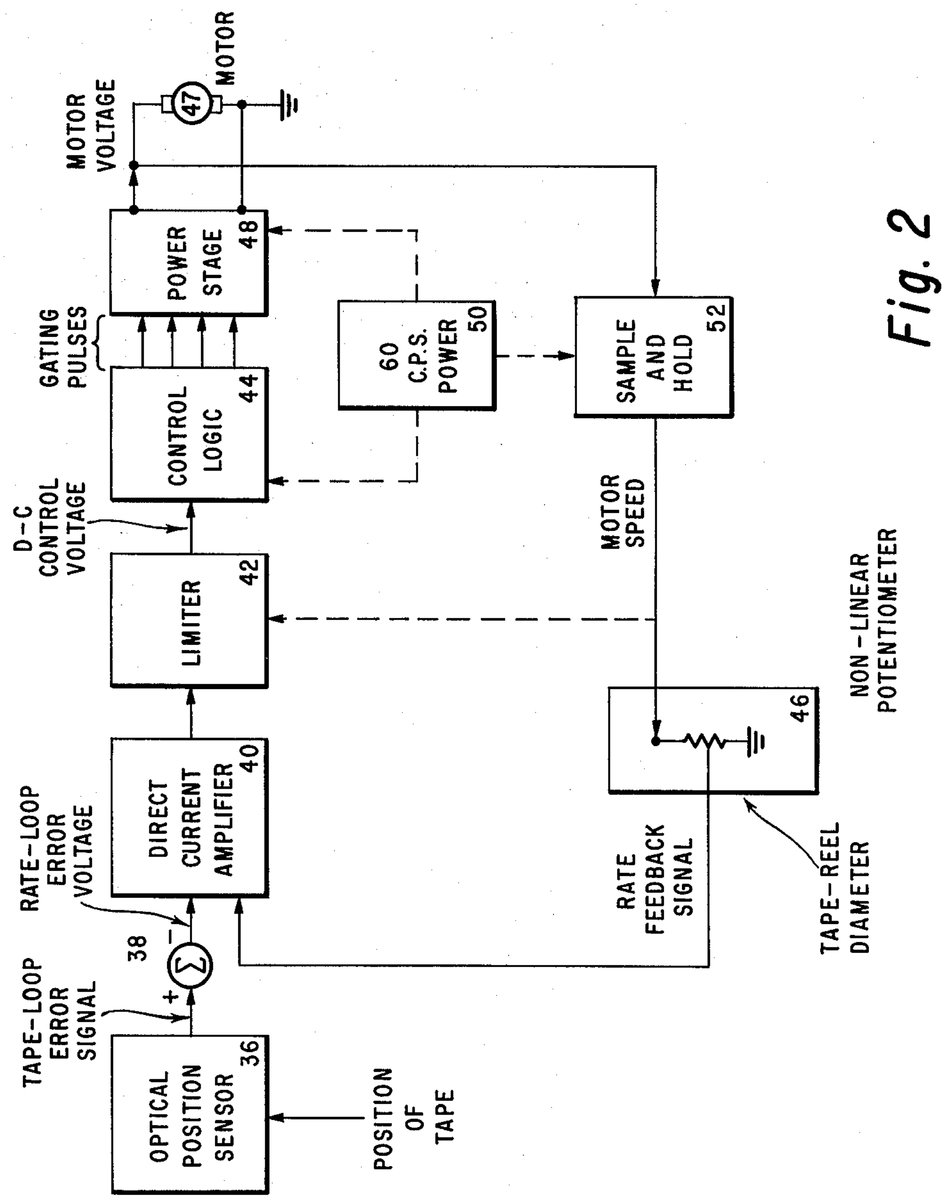
FIG. 2 is a block diagram of a servo system for the apparatus of FIG. 1.
Figure 3A:
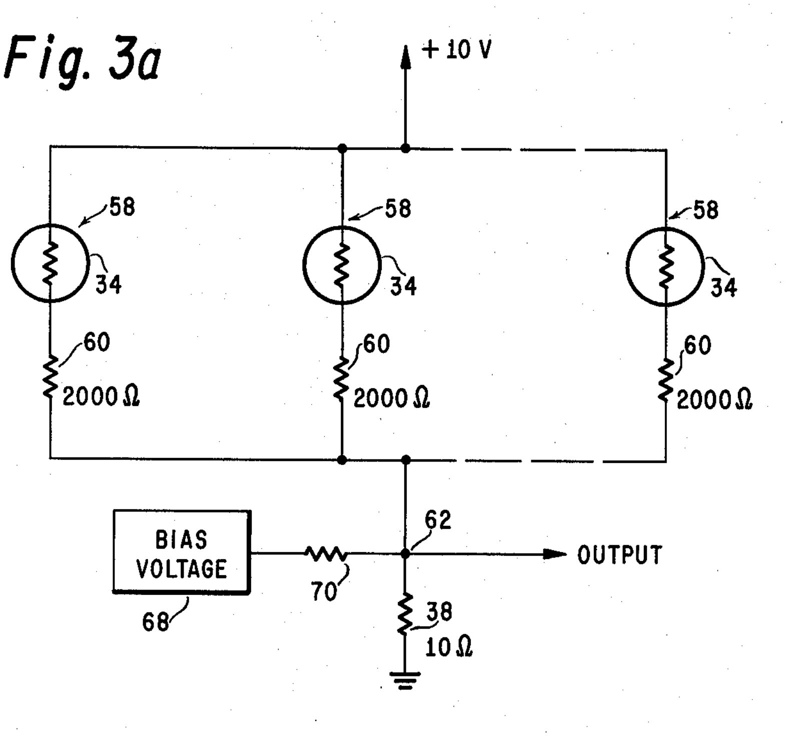
Figure 3B:
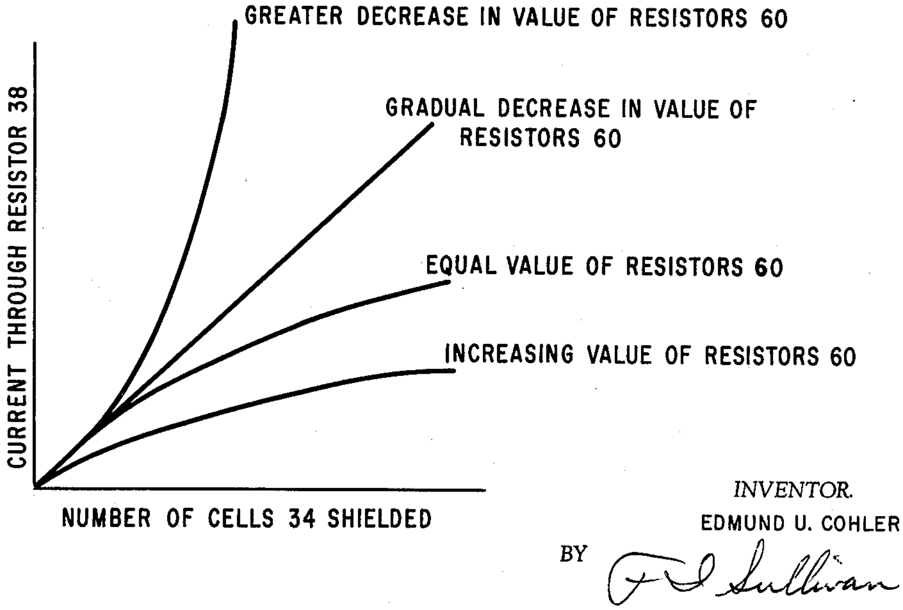
Figure 3C:
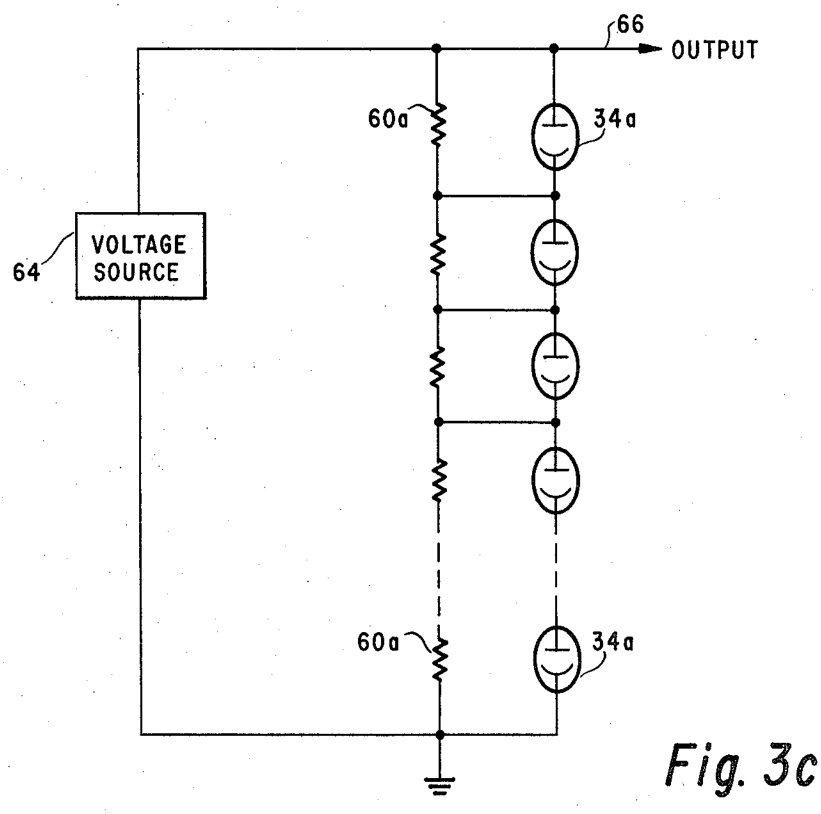
Figure 4:
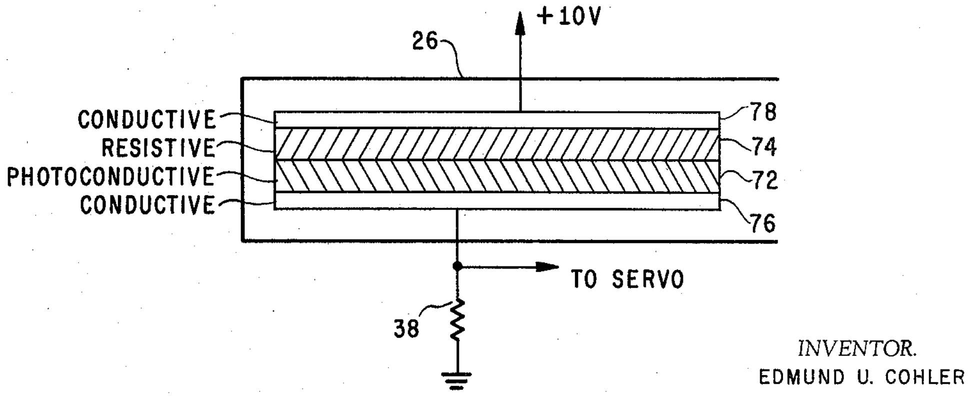

FIGS. 3*a* and 3*c* are schematic representations of alternative electronic circuits for the sensor of FIG. 2;

FIG. 3*b* is a plot of currents resulting from different resistance combinations in the circuit of FIG. 3*a*; and, FIG. 4 is an alternative embodiment of the sensor equipment of FIG. 1.

Although the motor voltage compensating network, tape position sensing structure, and associated electronics of the illustrative embodiment of the invention under description are useful with many types of magnetic tape handlers and web transports in general, and even in control systems unrelated to the web transport problem, for the purposes of the present explanation it will be assumed that they are operating with a magnetic tape transport of the type described in copending United States patent application Serial No. 199,740, filed by R. H. Davison, J. G. Simon, and J. O. Esselstyn, on June 4, 1962, now U.S. Patent No. 3,122,295 and assigned to Sylvania Electric Products Inc. That application may be consulted for details of structure and operation. For the purposes of the following explanation, however, a brief description of its structure and operation is sufficient.

Referring to FIG. 1, a magnetic tape 10 is threaded over a brake 12, located under a read-write head 14, and in either direction from there to a tape transport passage defined by the clearance between a constantly rotating capstan 16 and a companion air exhaust manifold 18. The two capstans rotate in opposite directions, so that the direction of motion past the head 14 is controlled by selectively exhausting air under pressure from one or the other of the manifolds. The selective operation of reel drive motors for each of two reels 20 and 22, contained with a magazine 24, is coordinated with the selective pulsing of the exhaust manifolds, so that the reels are turned in the proper direction to either play out or take up tape; and, as explained in the introductory remarks to this specification, buffer wells 26 and 28 are employed to provide a slack loop in the tape between the driving capstans and the reels to overcome inertia problems during the start and stop operation.

The buffered tape wells are connected to a vacuum source 30 for drawing tape into the well, but the accuracy of the control of the vacuum over the length of tape in the well is somewhat variable. Therefore, it is necessary to determine the length of tape in the well and speed up or slow down the reel drive motors to avoid the tape coming completely out of the well or, on the other hand, having so much of the tape length in the well that interruption of the smooth feed of tape to the read-write head is prevented. In the illustrative embodiment of the invention to be described, this is done with a servo control system which operates reels 20 and 22 in accordance with tape position as sensed by the combination of light sources 32 and photocells 34.

FIG. 2 shows a block diagram of a suitable servomechanism network having an optical position sensor system 36 for imparting information to a summing resistor 38, whose signal or error voltage is transmitted to a direct current amplifier 40, which provides the control voltage to actuate a limiter 42 and control logic 44. The rate feedback signal from the non-linear potentiometer 46 is substracted from the tape loop error signal of the optical sensor 36 at the input to the direct current amplifier 40, and a motor 47 is driven by a power stage 48, which acts as a switch to sample a 60 c.p.s. power supply 50.

The power stage 48 comprises a silicon controlled rectifier which provides a phase reversible full-wave output and has its control rectifiers energized by four gating pulses generated by control logic 44. This logic circuit 44, which has an input direct current control voltage signal from the limiter 42, averages that input voltage over a half cycle of the supply 50 and then during the next half cycle provides an SCR gating pulse to the SCR power stage. This gating pulse turns on the appropriate SCR at the proper instant to provide a pulse of current into the motor 47. The average value of this current pulse is proportional to the average value of the direct current control voltage from the limiter 42 over the previous half cycle.

The limiter 42 is placed ahead of the control logic 44 to limit the direct current control voltage fed to the logic circuit and, thereby, the torque of the motor 47. The limiter 42 is biased by a signal which is proportional to the speed of the motor 47, and thus provides a constant limit for the output torque regardless of speed.

A rate feedback signal is provided by sampling the voltage input to motor 47 with a narrow pulse twice per cycle by means of a sample-and-hold circuit 52. This sampling is performed at instants in which all the control rectifiers of the SCR power stage 48 are turned off. That is, the time when motor 47 input current must be zero. With the motor current equal to zero, the motor voltage consists only of the back electromotive force, and thus provides a good measure of motor speed. The sampled values of motor voltage occurring twice per cycle are clamped between sampling instants to provide a continuous speed feedback signal indicative of motor speed.

The motor speed signal is fed to the non-linear potentiometer 46 which is coupled to an arm (not shown) which measures the amount of tape on the tape reels by being spring loaded against the tape wound on the reels. Thus, this potentiometer varies the gain of the rate feedback path in proportion to the mass, and therefore the inertia, of the reel and thereby assures optimum performance regardless of the amount of tape on the reel.

As mentioned before, the rate feedback signal is subtracted, in the amplifier 40, from the error signal which represents the variance of the tape loop in the tape buffer well from a predetermined zero point, thereby forming a total rate-loop error voltage.

As explained previously, FIG. 1 shows the structure of the tape position sensing device, which is made up of a series of light sources 32 along the side of tape walls 26 and 28. Each light source 32 has a corresponding photoconductive device 34 and the tape wells may be partially masked with suitable liners 54 and 56 or the light sources and photocells may be recessed in some suitable manner to direct the separate light paths and prevent spurious optical signals from interfering with proper operation of the system. The operation of this sensing system takes advantage of large changes in resistance, e.g. a factor of 10,000 or more with cadmium selenide used in photoconductive devices 34, with small changes in illumination of the light sources 32. Using this suggested association of structural components, it is possible to use the device in an essentially digital fashion, insensitive to changes in light 32 and photocell 34 characteristics. For example, in the case of Clarex type CL603AL photoconductive cells 34, their resistance changes from about 200 ohms when illuminated with 100 foot candles to over 5 megohms when illuminated with a few hundredths of a foot candle.

FIG. 3*a* shows schematically the electronic circuit of one embodiment of this optical sensing system. It comprises parallel branches 58 of photoconductors 34 and associated resistors 60. These branches 58 join into a common output summing resistor 38. As each photocell 34 is illuminated, it adds an increment of current into the load resistor 38 (recommended value about 10 ohms). The current per increment is determined by resistors 60 serially connected to a photoconductor 34 in each branch 58. It is recommended that the value of the resistors 60 be about 2 kilohms, because the photocell 34 resistance is small compared to 2000 ohms when the photocell 34 is illuminated and is large compared to 2000 ohms when the photocell 34 is not illuminated. Thus, variations in individual photocell 34 characteristics, or variations in individual cell 34 resistances, with changes in temperature, etc. do not significantly affect the overall operation of the system. In addition, the output level is high, there is negligible drift, and the cost is low.

The number of cells 34 which are illuminated at any one instance depends upon the position of the tape in the wells 26, 28. If the cells 34 are placed uniformly along the length of the wells, this number of illuminated cells will be linear with respect to tape position. Thus, the total current into the load resistor 38 will be the sum of the currents through each of the cells 34 and will also vary linearly with respect to tape position. Of course, the voltage across the resistor 38 will be proportional to this current and will also be linear. Some non-linearity may occur if all the resistances 60 are chosen equal. This non-linearity will result from the curent increments decreasing as the voltage at the summing junction 62 increases. Since the sequence in which these resistors 60 add their currents into the summing junction is known, this non-linearity can be eliminated by properly scaling the resistance 60 values along the well. FIG. 3*b* shows representative current plots for equal, increasing or decreasing values of resistors 60. It has been found that, with the components and values suggested above, a current curve smooth enough for input to a servo system may be obtained with cells 34 spaced at one-half inch intervals, i.e. twenty-eight cells for a fourteen inch tape well.

FIG. 3*c* is a schematic diagram of an alternative circuit arrangement for the optical sensor system 36. Here, instead of the parallel arrangement of FIG. 3*a*, a series voltage divider of resistors 60*a* is connected across a voltage source 64, and a separate photocell 34*a* is connected in shunt with each of the resistors 60*a*. Thus, current is summed in the voltage divider network and the voltage signal at terminal 66 is a linear representation of the location of tape within the well.

In addition to relative insensitivity to changes in component characteristics and light level, this sensor has several other advantages. For example, in the circuit of FIG. 3*a*, by adjusting the bias voltage applied from a source 68 through a resistor 70, it is possible to determine what value of current through resistor 38 will keep the tape at the midpoint of the buffer well. Also, since the output is a summing junction 62, direct current biases may be easily added to set the reference position (reference voltage) applied to the branches 58. Moreover, since this sensor is to be used in a servo system, its output will generally have to be summed with that of some other part of the system. The summing junction 62 again provides an extremely simple method of doing this. Even a complete failure of one or several of the photoconductors 34 will not cause serious trouble with the system since it introduces only local non-linearities which may result in some jitter of the tape but do not cause tape breakage or other serious failure. In fact, one or two light bulbs arranged to irradiate all of the photocells 34 not shielded by the position of the tape may be employed instead of a separate light source 32 for each photoconductor 34. It has been observed with such a two-bulb light supply that the system will operate satisfactorily even when one is extinguished. The sensor which has been described also eliminates the need for high-gain amplifiers since the output levels, with reasonable resistance and available photoconductors, can be made anywhere from several tenths of a volt to several volts, depending upon what is desirable in the servo system. The only significant area for variation in characteristics is the variation of the power supplies determining the current increments and the bias level. However, these supplies can be regulated to a greater degree of accuracy than would normally be required in any position sensor.

One of the significant features of this type of sensor is that it can be fabricated in a continuous form with graphically deposited resistors and photoconductors in the manner shown in FIG. 4. Here, the parallel configuration of FIG. 3*a* is accomplished by providing a tape buffer well 26 with a sensor comprising strips of photoconductive material 72 and resistive material 74 in electrical contact with each other along their length, each also being in similar electrical contact along its opposite side with a conductive strip 76 and 78, respectively. Thus, with conductor 78 connected to a voltage source and conductor 76 connected to summing resistor 38, as tape (not shown) moves into and out of the well 26 it shields more or less of the photoconductive strip 72 from the light source (also not shown) and thereby varies the current input to the summing resistor and the control voltage signal to the servo system.

The invention has been described with reference to one illustrative embodiment and some modifications thereof. It is not, however, limited to the specifics of this description. For example, other types of switches such as pressure sensitive devices could be used instead of the photoconductive cells 32 to sense the position of the tape within the well, or other types of optical sensing with different arrangements of light sources, masks, etc. may be employed. Consequently, the invention is not limited to the particular features of the foregoing description and accompanying drawings, but embraces the full scope of the following claims.

What is claimed is:

1. For magnetic tape transport apparatus having at least one tape reel, a buffer well for handling slack tape from said reel, a motor for turning said reel and a servo system for controlling the operation of the motor in accordance with the position of tape within the well, a tape sensor system comprising: a plurality of light sources; a corresponding plurality of photocells; said light sources and said photocells being so arranged along the length of said well that tape moving up and down within the well shields or exposes individual ones of said photocells with respect to light from a corresponding one of said sources, with the ratio of shielded and exposed cells being a function of the position of said tape within said well; a plurality of resistors corresponding to said plurality of photocells, each of said resistors having a resistance value which is significantly higher than the exposed resistance and significantly lower than the shielded resistance of its corresponding photocell; means for controlling the current flow through each of said resistors by the shielded or exposed condition of its corresponding photocell; means for summing the current flow through said resistors; and, means for deriving a control signal from said current summing.

2. The invention according to claim 1 wherein said means for summing current flow comprises: a source of potential; a current summing resistance; and, a plurality of parallel current paths connected between said source and said summing resistance, said paths each being comprised of a series connection of one of said photocells and its corresponding resistor.

3. The invention according to claim 1 wherein said means for summing current flow includes a source of potential, said resistors are serially connected in a voltage divider arrangement across said source, and each of said photocells is connected in shunt across its corresponding resistor.

4. Web transport apparatus comprising: at least one reel for winding and unwinding said web; a motor for turning said reel to perform said winding and unwinding operations; a web buffer unit; a source of electric potential; a plurality of photoconductive elements; a plurality of impedance elements corresponding to said plurality of photoconductive elements; said impedance and said photoconductive elements being so selected that each photoconductive element has a "light" resistance substantially less than, and a "dark" resistance substantially greater than, its corresponding impedance element; means for selectively changing combinations of said photoconductive elements from "light" to "dark" condition in accordance with the position of said web within said unit; and, means for connecting said impedance elements to said source of potential and for summing the flow of electric current from said source through said impedance elements to control the operation of said motor.

5. An input to a servo-mechanism to compensate for motion of a tape loop in a vacuum tape well of a magnetic tape transporting mechanism comprising: a magnetic tape; a first reel for feeding said tape; a first vacuum tape buffer well for storing the slack in said tape being fed from said first reel; a read-record head; a second vacuum tape buffer well for holding the slack in said tape after it is fed past said read-record head; a second reel for take-up of said tape; a servo-mechanism for compensating the speed of said first and second reels selectively according to the length of said tape in said vacuum tape buffer wells; and, an input to said servo-mechanism sensitive to the length of said tape in said buffer wells, said input to said servo-mechanism comprising a number of switches each of whose bistable condition is sensitive to motion of said tape past each of said switches, a resistive network for digital to analog conversion, and a summing load resistor connected in series with said resistive network.

6. The invention according to claim 5 wherein said number of switches are distributed along the length of each of said tape wells.

7. Apparatus for sensing changes in position of a moving object, a plurality of bistable signal devices operative to represent the motion of said object as digital information, an impedance network having a plurality of branches corresponding to the number of said bistable signal devices, each branch comprising at least one impedance element and at least one of said bistable signal devices and an output terminal common to all of said branches, and a summing load resistor having a resistance significantly smaller than the resistance of the impedance element in each of said branches connected to said ouput terminal, said impedance element having a consecutively increasing magnitude of resistance in said branches proportioned to provide a substantially linear analog voltage across said summing load resistor representative of the cumulative electrical signals applied to said branches.

8. Apparatus for sensing changes in position of a moving object comprising: a moving object, a plurality of bistable signal devices operative to represent the motion of said object as digital information, an impedance network having a plurality of branches corresponding to the number of said bistable signal devices, each branch comprising at least one impedance element and at least one of said bistable signal devices and an output terminal common to all of said branches, and a summing load resistor having a resistance significantly smaller than the resistance of the impedance element in each of said branches connected to said output terminal, said impedance element having a consecutively increasing magnitude of resistance in said branches proportioned to provide a non-linear analog voltage across said summing load resistor representative of the cumulative electrical signals applied to said branches thereby to provide a substantially non-linear representation of motion of said object.

9. In tape transport apparatus including an elongated buffer well for receiving a tape loop and a motor controllable in accordance with the position of the tape loop within the well, tape loop position sensing apparatus comprising, a plurality of light sources, a corresponding plurality of photocells, said light sources and said photocells being distributed along the length of said well and so disposed that a tape loop moving within said well shields or exposes individual ones of said photocells with respect to light from a corresponding one of said sources, the ratio of shielded and exposed photocells being a function of the position of the tape loop within the well, a plurality of resistors corresponding to said plurality of photocells, each connected in circuit with a respective photocell and having a resistance value significantly higher than the exposed resistance and significantly lower than the shielded resistance of its respective photocell, a source of potential connected in circuit with said resistors and photocells for causing current flow through each of said resistors in response to whether its corresponding photocell is shielded or exposed, and means for deriving an analog control signal for said motor proportional to the sum of the current flow through said resistors.

10. The invention according to claim 9 wherein said resistors and photocells are connected in a like plurality of parallel paths between said source of potential and a common summing resistor, said paths each comprising a series connection of one of said photocells and its respective resistor.

11. The invention according to claim 10 wherein the resistor in each of said parallel paths is of a significantly greater magnitude of resistance than said common summing resistor and of consecutively increasing magnitude and proportioned to provide a substantially linearly varying voltage across said summing resistor representative of the position of the tape loop within the well.

12. The invention according to claim 9 wherein said resistors are serially connected in a voltage divider arrangement across said source of potential, and each of said photocells is connected in shunt across its respective resistor.

13. Apparatus for producing an analog representation of changes in position of an object movable along a rectilinear path comprising, in combination, a plurality of light sources distributed along said path, a like plurality of photocells distributed along said path in one-to-one correspondence with said light sources and so arranged that an object moving along said path shields or exposes individual ones of said photocells with respect to light from its respective source, a like plurality of resistors each connected in circuit with a respective one of said photocells and having a resistance value which is significantly higher than the exposed resistance and significantly lower than the shielded resistance of its respective photocell, a source of potential connected in circuit with said resistors and photocells for causing current flow through each of said resistors of a magnitude depending on whether its corresponding photocell is shielded or exposed, and means for summing the current flow through said resistors to derive an analog summation voltage representative of the position of said object.

References Cited by the Examiner

UNITED STATES PATENTS

| | | | |
|---|---|---|---|
| 2,768,310 | 10/1956 | Kazan et al. | 250—211 |
| 2,912,592 | 11/1959 | Mayer | 250—211 |
| 2,952,415 | 9/1960 | Gilson | 242—55.12 |
| 2,965,867 | 12/1960 | Greig | 338—15 |
| 3,016,207 | 1/1962 | Comstock | 242—55.12 |
| 3,053,450 | 9/1962 | Litz | 338—15 |
| 3,098,186 | 7/1963 | Williamson et al. | 318—162 |

MERVIN STEIN, *Primary Examiner.*